US010434439B2

(12) United States Patent
Vollmer, II et al.

(10) Patent No.: US 10,434,439 B2
(45) Date of Patent: Oct. 8, 2019

(54) PORTABLE INDOOR/OUTDOOR ATMOSPHERIC WATER GENERATOR

(71) Applicant: DewGood, Inc., Los Angeles, CA (US)

(72) Inventors: Reuben Paul Vollmer, II, Los Angeles, CA (US); Pavel Tikhonenko, Moscow (RU)

(73) Assignee: DewGood, Inc., Los Angeles, CA (US)

( * ) Notice: Subject to any disclaimer, the term of this patent is extended or adjusted under 35 U.S.C. 154(b) by 0 days.

(21) Appl. No.: 15/721,337

(22) Filed: Sep. 29, 2017

(65) Prior Publication Data

US 2019/0099692 A1    Apr. 4, 2019

(51) Int. Cl.
*F25B 49/02*    (2006.01)
*C02F 9/00*    (2006.01)
(Continued)

(52) U.S. Cl.
CPC ............ *B01D 5/0072* (2013.01); *B01D 5/006* (2013.01); *C02F 1/002* (2013.01); *C02F 9/005* (2013.01); *F25B 27/005* (2013.01); *F25B 49/02* (2013.01); *C02F 1/001* (2013.01); *C02F 1/68* (2013.01); *C02F 2201/008* (2013.01);
(Continued)

(58) Field of Classification Search
CPC .............................................. C02F 2209/008
See application file for complete search history.

(56) References Cited

U.S. PATENT DOCUMENTS

| 2,682,758 A | 7/1954 | Harris |
| 2,996,897 A | 8/1961 | Grimes |

(Continued)

FOREIGN PATENT DOCUMENTS

| CN | 105369856 | 3/2016 |
| CN | 105756127 | 7/2016 |

(Continued)

OTHER PUBLICATIONS

UEA Water, Atmospheric Water Solutions Webpage printout, Aug. 28, 2017.
(Continued)

*Primary Examiner* — Cassey D Bauer
(74) *Attorney, Agent, or Firm* — Hiibner Law Group; Kristin C. Hiibner

(57) ABSTRACT

A wirelessly controlled device for atmospheric water generation is provided. The device comprises an atmospheric water generator for generating filtered potable water and a wireless external control system. The wireless external control system comprises one or more display presentation pages for displaying a plurality of operating parameters for the atmospheric water generator, including content display with a variety of operation parameters and historical water collection data for operation of the atmospheric water generator. The wireless external control also has one or more display pages configured for user input for a user to select one or more water generation parameters for operation of the atmospheric water generator. Once the device is directed by the wireless external control system to generate water, the device is capable of automatic water generation until the device fulfills the one or more set water generation parameters.

20 Claims, 6 Drawing Sheets

(51) Int. Cl.
- *B01D 5/00* (2006.01)
- *F25B 27/00* (2006.01)
- *C02F 1/00* (2006.01)
- *C02F 1/68* (2006.01)

(52) U.S. Cl.
CPC .. *C02F 2201/009* (2013.01); *C02F 2209/008* (2013.01); *C02F 2209/42* (2013.01); *C02F 2303/04* (2013.01); *F25B 2600/13* (2013.01)

(56) References Cited

U.S. PATENT DOCUMENTS

| | | | |
|---|---|---|---|
| 3,675,442 A | | 7/1972 | Swanson |
| 5,207,562 A | * | 5/1993 | Neibrook ............... F04D 13/086 |
| | | | 417/234 |
| 5,669,221 A | * | 9/1997 | LeBleu ................ B01D 5/0072 |
| | | | 62/92 |
| 7,089,763 B2 | | 8/2006 | Forsberg |
| 9,400,131 B2 | | 7/2016 | West |
| 9,561,451 B2 | | 2/2017 | Dorfman |
| 2005/0284167 A1 | * | 12/2005 | Morgan ................. B01D 5/009 |
| | | | 62/272 |
| 2010/0101929 A1 | * | 4/2010 | Kamen .................... B01D 1/28 |
| | | | 202/185.3 |
| 2013/0337120 A1 | * | 12/2013 | Sabates, III ........ A47J 31/4403 |
| | | | 426/231 |
| 2013/0340458 A1 | | 12/2013 | Shaw et al. |
| 2014/0083120 A1 | | 3/2014 | Nowak et al. |
| 2014/0182321 A1 | | 7/2014 | Constablle et al. |
| 2016/0129369 A1 | * | 5/2016 | Dorfman .............. B01D 5/0051 |
| | | | 62/189 |
| 2016/0169574 A1 | * | 6/2016 | Jakovina ................... E03B 3/28 |
| | | | 62/272 |
| 2016/0333553 A1 | | 11/2016 | Dorfman |

FOREIGN PATENT DOCUMENTS

| | | |
|---|---|---|
| CN | 105756128 | 11/2016 |
| CN | 106088233 | 11/2016 |
| WO | 2008108740 | 9/2008 |
| WO | 2013084077 | 6/2013 |
| WO | 2016187709 | 12/2016 |

OTHER PUBLICATIONS

Air to Water Technologies, Inc. Webpage printout, Aug. 28, 2017.
RECOR Waste to Entergy Solutions, Atmospheric Water Generators brochure.

* cited by examiner

PORTABLE INDOOR/OUTDOOR ATMOSPHERIC WATER GENERATOR

BACKGROUND

Fresh water, for drinking and crops, has become an increasingly valuable resource. People around the world need fresh water. Although most of our planet is covered with water, only a small fraction of that water is drinkable or suitable for crops. Our water supply has become increasingly contaminated with chemicals from pharmaceuticals, agriculture and industry and microbials. People have also become increasingly concerned with drinking water quality. However, water treatment becomes more complicated, expensive, and less effective as water becomes more contaminated. One solution is to buy bottled water, but this is an expensive solution and has led to a large consumer waste problem (from used plastic bottles), and contamination of the bottled water from the plastic bottle itself.

One remedy for a lack of clean water is to generate water from the atmosphere. Systems for converting atmospheric moisture into potable water are known. Examples of known systems can be found in U.S. Pat. Nos. 3,675,442; 2,996,897; 2,682,758; U.S. 20140182321; US 2016/0333553; and WO 2013/084077. However, known systems suffer from a lack of portability and ease of use, often being large, complex, and bulky, requiring that the water generator be moved by truck or significant manpower. These large systems are unsuitable for consumer use, which has resulted in a lack of consumer acceptance of such systems. Other systems are highly complex, expensive, and suffer from energy inefficiencies making them economically unviable except in extreme conditions were potable water is unavailable, e.g., military applications, where delivering potable water outweighs expense and portability.

Therefore, there is a need for an improved portable atmospheric water generator which efficiently produces potable water, at an energy efficiency level that is attractive to consumers and is user friendly such that the water generator will be used an implemented by the average consumer.

SUMMARY

According to the present invention, a wirelessly controlled device for atmospheric water generation is provided. The device has externally controlled wireless operation controls which eliminate the bulk of the controls from the footprint of the device. The wireless controls of the device can be incorporated into existing technology, such a smart phone, making the device user friendly and attractive to a wide variety of consumers that are familiar with the smart phone technology platform. The device generates potable filtered drinking water exterior to the housing of the device, which further compacts the footprint of the device and increases energy efficiency, as water is not stored and chilled or heated within the device. Accordingly, the atmospheric water generation device of the present invention is small, portable, and energy efficient, making it an attractive option for consumers for personal use. In some embodiments, the device is sealed to the outside elements making it suitable for either indoor or outdoor use, and for personal or agricultural applications.

According to one embodiment, the device comprises an atmospheric water generator for generating filtered potable water and a wireless external control system. The atmospheric water generator comprises a housing, an internal control and monitoring assembly. The internal control and monitoring assembly has electronic controls, a wireless internal communication assembly, a device memory storage, and temperature and humidity sensors. A refrigeration condensing unit is provided in electrical connection with the internal control and monitoring assembly, the refrigeration condensing unit having a refrigerator compressor, a fan unit, and an evaporator condenser unit, in thermal connection with the refrigerator compressor. A collection tank having an internal float switch is positioned in aqueous connection with the refrigeration condensing unit. A pump, in electrical connection with the internal control and monitoring assembly, transfers condensed water from the collection tank into the water filtration system and a potable water outflow conduit delivers water to the exterior of the device housing. The wireless external control system comprises one or more display presentation pages for displaying a plurality of operating parameters for the atmospheric water generator, the display presentation page having (i) content display comprising a plurality of system operation parameters and a plurality of water collection data for operation of the atmospheric water generator; and (ii) at least one display configured for user input to detect one or more user selected operation parameters for operation of the atmospheric water generator. The wireless external control system also has a controller configured to wireless contact the atmospheric water generator for receiving and displaying system operation parameters and water collection data from the device and transmitting the one or more user input operation parameters to the atmospheric water generator.

According to another embodiment, a method of generating water using a wirelessly controlled system and device for atmospheric water generation is provided. According to the method, a wireless external control for operation and control of the device for atmospheric water generation is provided. One or more system operation parameters or one or more water collection data from the wireless internal control system are wirelessly provided to the wireless external control from an internal control and monitoring system of the atmospheric water generation device, and one or more system operation parameters or one or more water collection data are wirelessly provided from the wireless internal control system to the wireless external control. A user is able to select a plurality of operation parameters from a display on the wireless external control, which are then wirelessly transmitted to the atmospheric water generation device. The atmospheric water generation device generates filtered potable water according to the operation parameters and dispenses the filtered potable water exterior to the device until the provided user set operation parameters automatically terminate the generation of the filtered potable water.

FIGURES

These and other features, aspects and advantages of the present invention will become better understood from the following description, appended claims, and accompanying figures where:

DESCRIPTION

Figure 1:
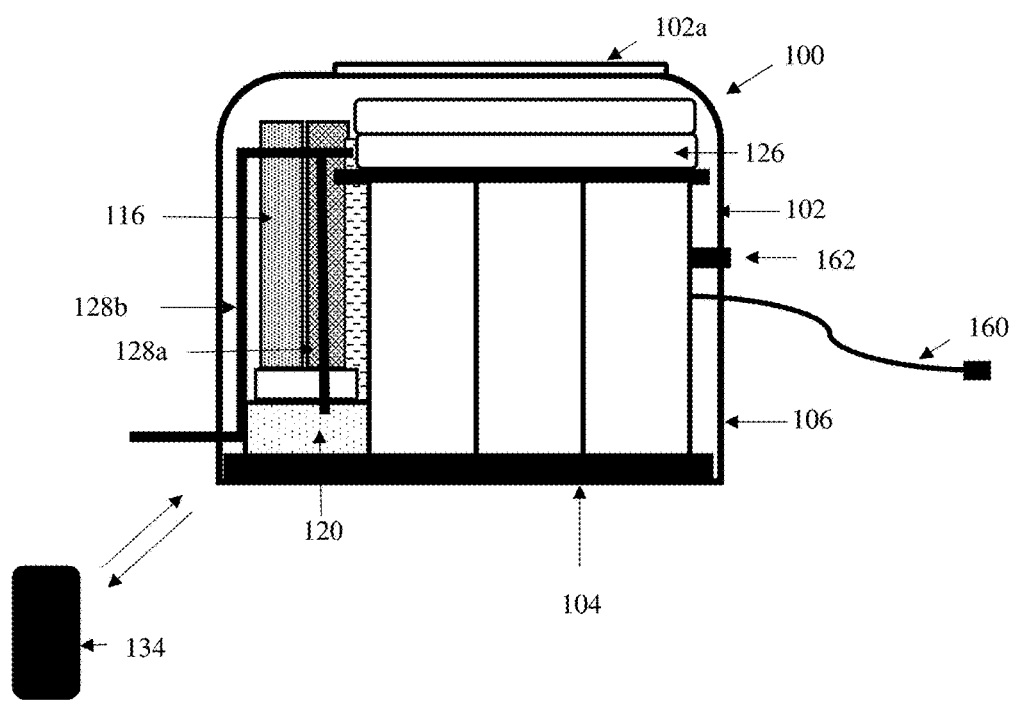
FIG. 1 is a front side cut away view of one embodiment of the atmospheric water generator according to the invention.
Figure 2:
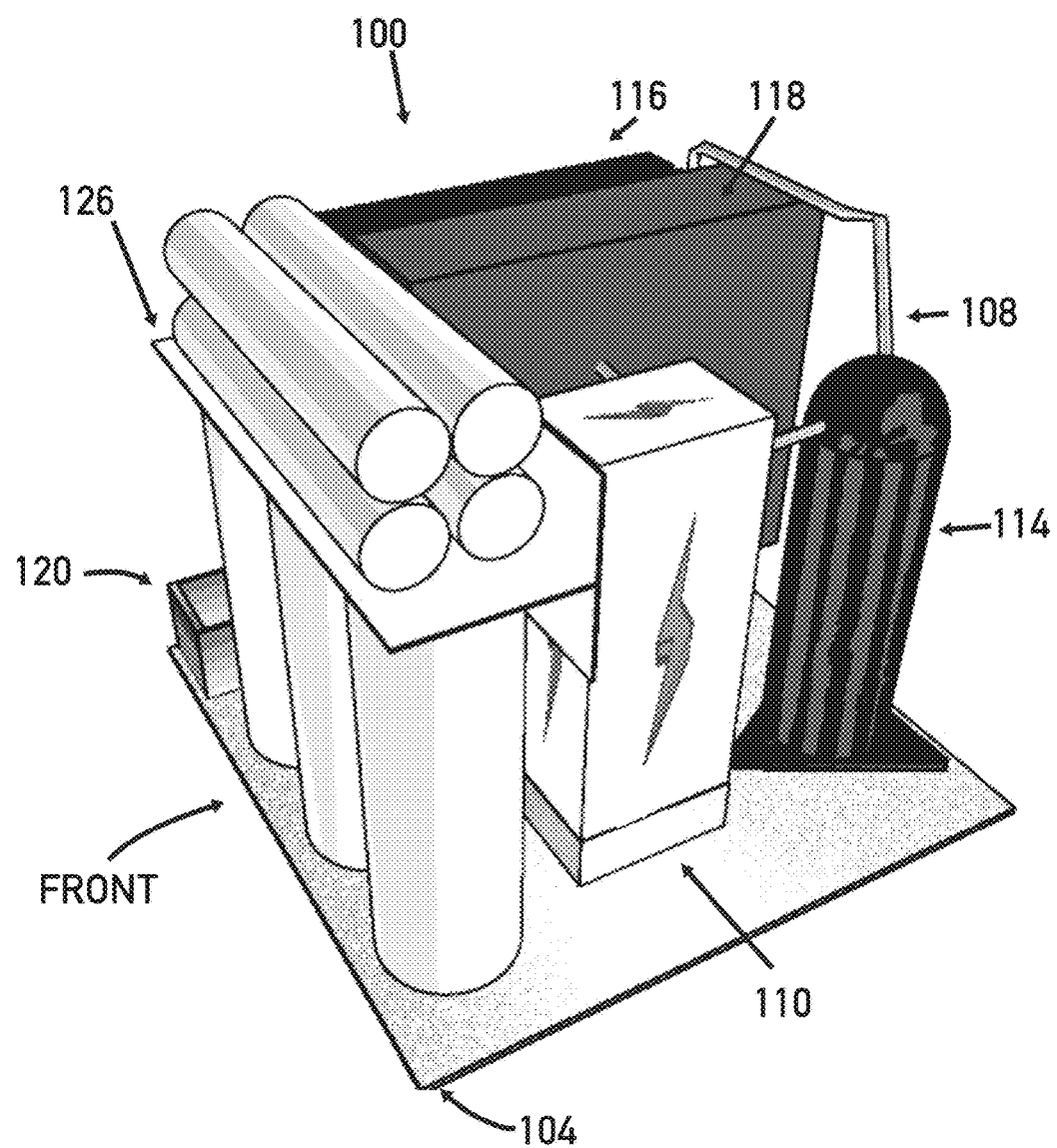
FIG. 2 is a top, front, right side perspective view of an atmospheric water generator according to one embodiment of the invention.
Figure 3:
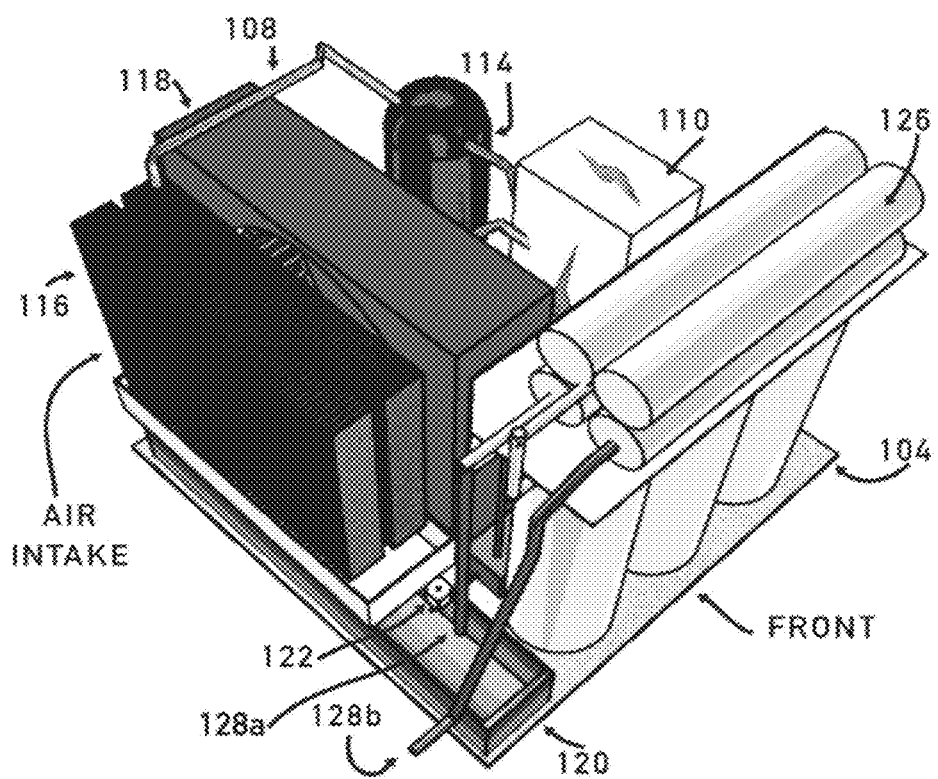
FIG. 3 is a top, front, left side perspective view of the atmospheric water generator according to the embodiment of the invention shown in FIG. 1.
Figure 4:
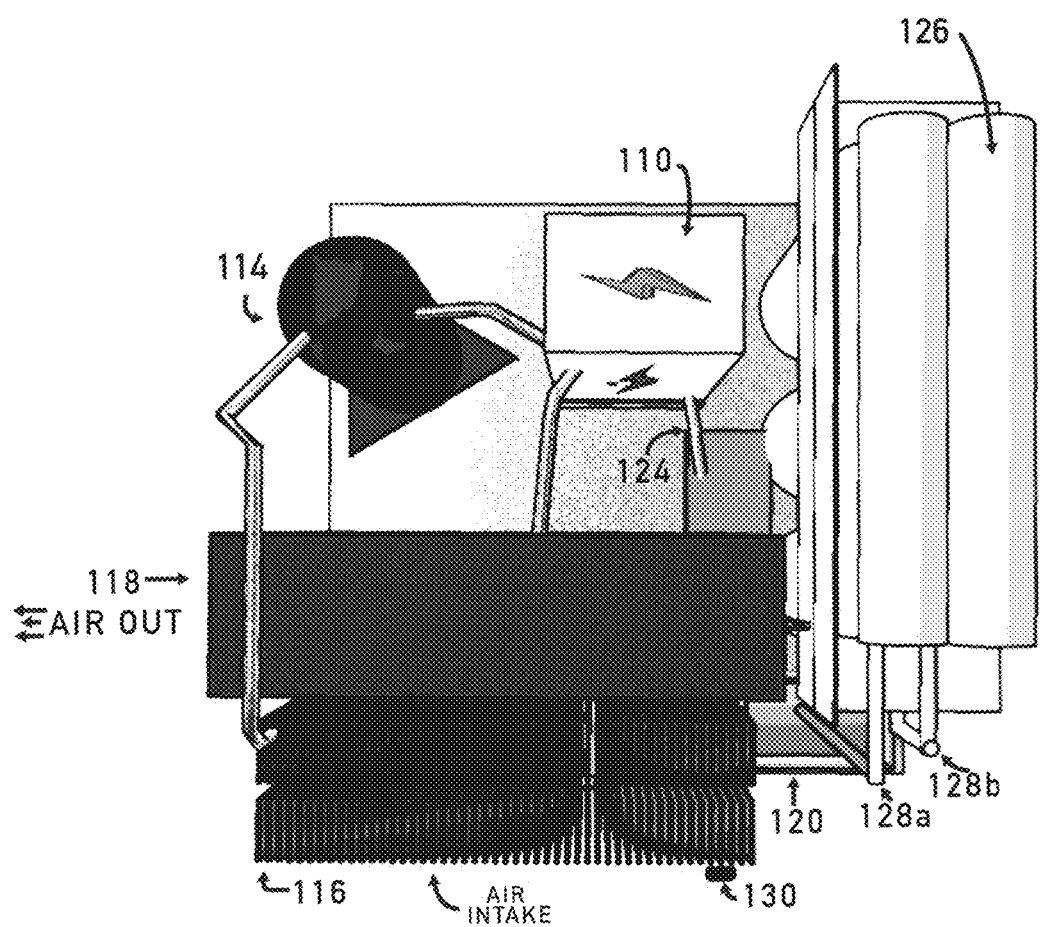
FIG. 4 is a top view of the atmospheric water generator according to the embodiment of the invention shown in FIG. 1.
Figure 5:
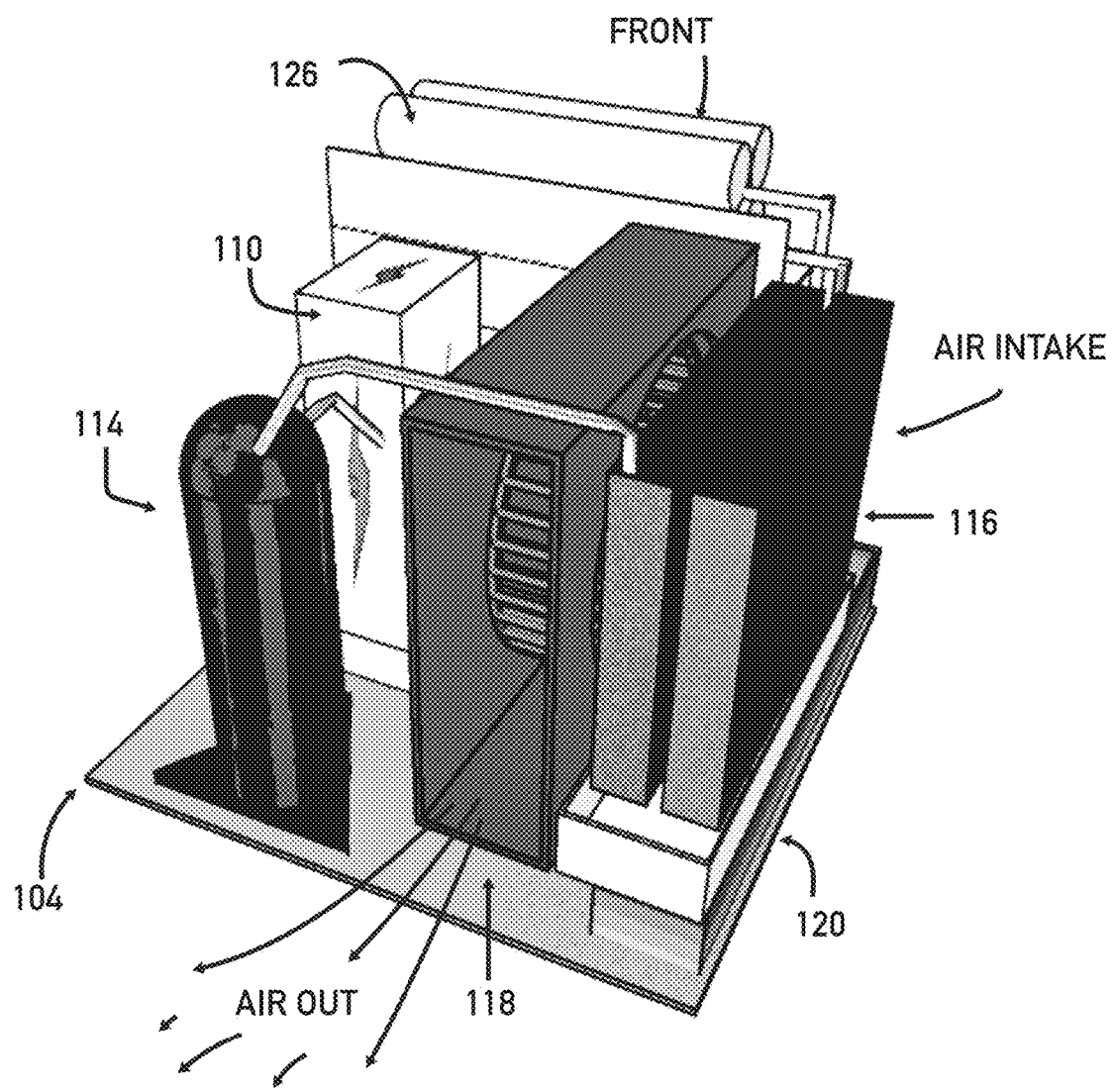
FIG. 5 is a rear perspective view of the atmospheric water generator according to the embodiment of the invention shown in FIG. 1.

According to the present invention, a wirelessly controlled device and method for atmospheric water generation is provided. The atmospheric water generator according to the invention can generate fresh water right where it's needed and is operable in either an indoor or outdoor setting. The atmospheric water generation device is externally controlled, preferably by Bluetooth, or other wireless connection, such as Wi-Fi, and programmed with a wireless user interface, such as a cell phone application, to set the exact quantity of water to be made. Accordingly, large quantities of fresh water can be produced precisely, depending on user set parameters, and from a distance. In other embodiments, the user interface allows for setting of water generation parameters based on the ambient humidity level in a given setting. For people growing indoors, this allows a user to set a customizable humidity level for a particular plant or plants being grown. This feature allows for water neutral farming, a system of growing plants indoors and recycling the water vapor plants let go of and pumping it back to their root systems. In other embodiments, the ambient humidity level feature of the device is used in an indoor setting to simultaneously produce fresh potable water and control the humidity of the indoor environment. In other embodiments, the device also has an optional feature of having an external float switch and an auto fill setting to run continuously until the external float switch has been triggered.

The portable indoor/outdoor (I/O) atmospheric water generator is optionally made to work outside, which doesn't disrupt the noise, humidity level, and physical space as an indoor machine, but still has the flexibility to work indoors for user preferences. One advantage of outdoor operation is the device is only limited by atmospheric humidity, and potentially has access to unlimited water vapor volumes in all but the driest climates, as opposed to other devices made strictly for indoor use, which are limited by the humidity levels inside the building where the device is positioned.

Also, with the wireless control of the device, the device is operable from a distance, so a user can store the device under an RV, sailboat, or on the roof of a home. The device and wireless control system also include an atmospheric monitoring graph, so users especially those who grow food, can monitor and track the temperature, humidity, and dew point over the course of years, helping in the production of food over time and refining farming techniques. With the external float switch option, a user can keep a cistern full of water, for gardening and landscape watering use, emergency use, drought, or farming applications. Further, the device is portable, preferably fitting within a 20 inch cubic area, and weighing less than about 60 pounds, making the device carry able for an average person. Optionally, the device can be powered by conventional 120V power source or have optional solar energy power components for powering the device.

Referring now to FIGS. 1-5, a wirelessly controlled device 100 for atmospheric water generation is shown. The atmospheric water generator device 100 has a housing 102, encasing the device. The housing 100 has a bottom plate 104 and a top case 106 which is removably attached to the bottom plate 104. An internal control and monitoring assembly 110 comprises electronic controls (112a, not shown), device memory storage (112c, not shown), as well as and wireless internal controls (132, not shown). The device also has temperature and humidity sensors 130, positioned on the device to be exposed to the ambient air, exterior to the device 100, and in electronic or wireless communication with the internal control and monitoring assembly 110. A refrigeration condensing assembly 108, comprising a refrigerator compressor 114, an evaporator condenser unit 116 comprising an evaporator 116a and a condenser 116b, in thermal connection with the refrigerator compressor 114, and a fan 120, are positioned on the bottom plate 104 of the housing 102, and are in electrical connection with the internal control and monitoring assembly 110. A collection tank 120, having an internal float switch 122, is positioned on the bottom plate 104 of the housing 102, and in aqueous connection with the evaporator condenser unit 116 for collection of condensed water 144, such as by drip collection from the evaporator condenser unit 116. A pump 124, is positioned on the bottom plate 104 of the housing 102, in electrical connection with the internal control and monitoring assembly 110. A water filtration system 126 is positioned on the bottom plate 104 of the housing 102 and in aqueous connection with the collection tank 120, via a first aqueous conduit 128a, and in connection with the pump 124 and collection tank 120 via a third aqueous conduit 128c for filtration of the condensed water 144. A second aqueous conduit 128b, is in aqueous connection with the water filtration system 126 for delivery of potable water 146, exterior to the device.

In a preferred embodiment, the device 100 is generally portable and has a dimension of less than or equal to 20×20×20 inches. To achieve these compact dimensions, in some embodiments, the evaporator condenser unit 108 is vertically aligned on top of the collection tank, which aids in gravity collection of the condensed water and aids in the compact design of the device 100. In another preferred embodiment, the device has a weight less than or equal to 60 pounds, more preferably 55 pounds or less. Wheels, handles, or other components may also affixed to the housing to aid in the portability of the device.

As described herein, the housing 102, encases the components of the device 100, and is formed in two or more parts, including a bottom plate 104, for affixing components of the device 100. The top case 106 of the housing 102 is preferably removably attached to the bottom plate 104 of the housing 102. In some embodiments, the device 100 is configured for outdoor, and/or high humidity usage, and/or exposure to environmental elements and the housing 102 is made from weather resistant materials. In other embodiments, the housing further comprises a seal and/or is reversibly sealable upon closure such that the device is resistant to high humidity or outdoor elements. In other embodiments, the housing further comprises a hatch 102a for access to the water filtration system 126. According to some embodiments, the hatch 102a provides access to the water filtration system 126 for changing of the filters and in other embodiments, the water filtration system 126 is capable of filtering unpotable or dirty water added exterior to the water filtration system from the hatch 102a and producing filtered potable water 146.

The water filtration system 126 is preferably a multi-stage water filter. As the condensed water 144 entering the water filtration system 126 is relatively pure (as it is condensed from air), the water filtration system 126 preferably removes any microbes present in the water and adds minerals to the water to improve drinkability.

According to another embodiment, the device 100 has an optional exterior (external) float switch 160 in electronic connection with the internal control assembly 110. When the optional exterior (external) float switch 160 is used, the device 100 and exterior wireless controls 134 have an auto-fill mode and the device 100 automatically generates filtered potable water 146 in response to input from the external float switch 160. In other embodiments, the device 100 has a manual operation switch 162 accessible from an exterior portion of the housing 102 for manually operating and terminating operation of the device.

The device 100 is operable via a wireless external control system. The device 100, has an internal control and monitoring assembly 110 having an internal wireless communication device 132 and system for wirelessly linking the internal control and monitoring assembly 110 to the wireless external control 134 and correspondingly linking the wireless external control 134 to the internal control and monitoring assembly 110. In a preferred embodiment, the device 100 and wireless external control 134 communicate via a low-power wireless link assembly, such as Bluetooth, a high-speed, low-power microwave wireless link technology. The advantage of employing Bluetooth technology is that it does not require line-of-sight positioning for the wireless external control 134 and internal wireless communication device 132, it is high-speed, and low power. However, other wireless technology can be incorporated into the device 100, as will be understood by those of skill in the art.

The wireless external control system 134 has a user interface 140 with one or more display presentation pages for displaying a plurality of operating parameters for the atmospheric water generator 100. The display presentation page(s) content display comprising a plurality of system operation parameters 136 and a plurality of water collection data 138 (e.g., stored data) for operation of the atmospheric water generator. At least one display is configured for user input, where a user can input one or more user set water generation parameters 136a to be used as the operation parameters 136 for operation of the atmospheric water generator. The wireless external control system 134 is wirelessly linked to the internal wireless control 132 of the device 100 for receiving the system operation parameters 136 and water collection data 138 from the device 100 and transmitting one or more user set water generation parameters 136a to the atmospheric water generator device 100.

As will be understood by those of skill in the art, the user interface 140 of the wireless external control system 134 has a display with system operation parameters 136 and a plurality of water collection data 138. System operation parameters 136 may include features such as time, date, amount of water to be generated, humidity, and temperature and auto-fill functions. Water collection data 138 include historical data, collected from historical device operation and projected water collection data based on historical data. The user interface 140 is configured to accept user input regarding the mode of collection (i.e., user set water generation parameters 136a), based on set factors such as time, date, amount of water to be generated, humidity and temperature controls, and auto-fill mode. The device 100 is capable of automatic generation of filtered potable water 146 until the device 100 fulfills the user set water generation parameters 136a.

According to one preferred embodiment, at least one of the one or more user set water generation parameters 136a is a specified volume of water to be produced. A user will input a specified volume of water into the user interface 140, which is wirelessly transmitted from the external wireless control device 134 to the internal control and monitoring assembly 110. The device automatically generates filtered potable water 146 until the specified volume of water is produced. The device 100 then automatically terminates water generation.

In another preferred embodiment, at least one of the one or more user set water generation parameters 136a is a specified humidity level external to the device. A user will input the specified humidity level into the user interface 140, which is wirelessly transmitted from the external wireless control device 134 to the internal control and monitoring assembly 110. The device automatically generates filtered potable water 146 until the specified exterior humidity level is reached. The device 100 then automatically terminates water generation.

In another preferred embodiment, the device 100 further comprises an external float switch. According to this embodiment, at least one of the one or more user set water generation parameters 136a is a water level determined by the external float switch. A user will input the specified water level based on the external float switch, which is wirelessly transmitted from the external wireless control device 134 to the internal control and monitoring assembly 110. In this "auto-fill" mode, the device automatically generates filtered potable water until the water level determined by the external float switch has been reached. The device 100 then automatically terminates water generation.

In a more preferred embodiment, the user interface is a mobile app which lets the user set how much water is made at a time and at what humidity levels the device should run at for efficiency and indoor atmosphere control. The device also records temperature and humidity which is displayed on the mobile app to monitor every gallon produced for the life of the device. As a result, the increased efficiencies can empower farmers to optimize the climate to ensure top quality crops, especially for those horticulturalists who grow indoors.

Figure 6:
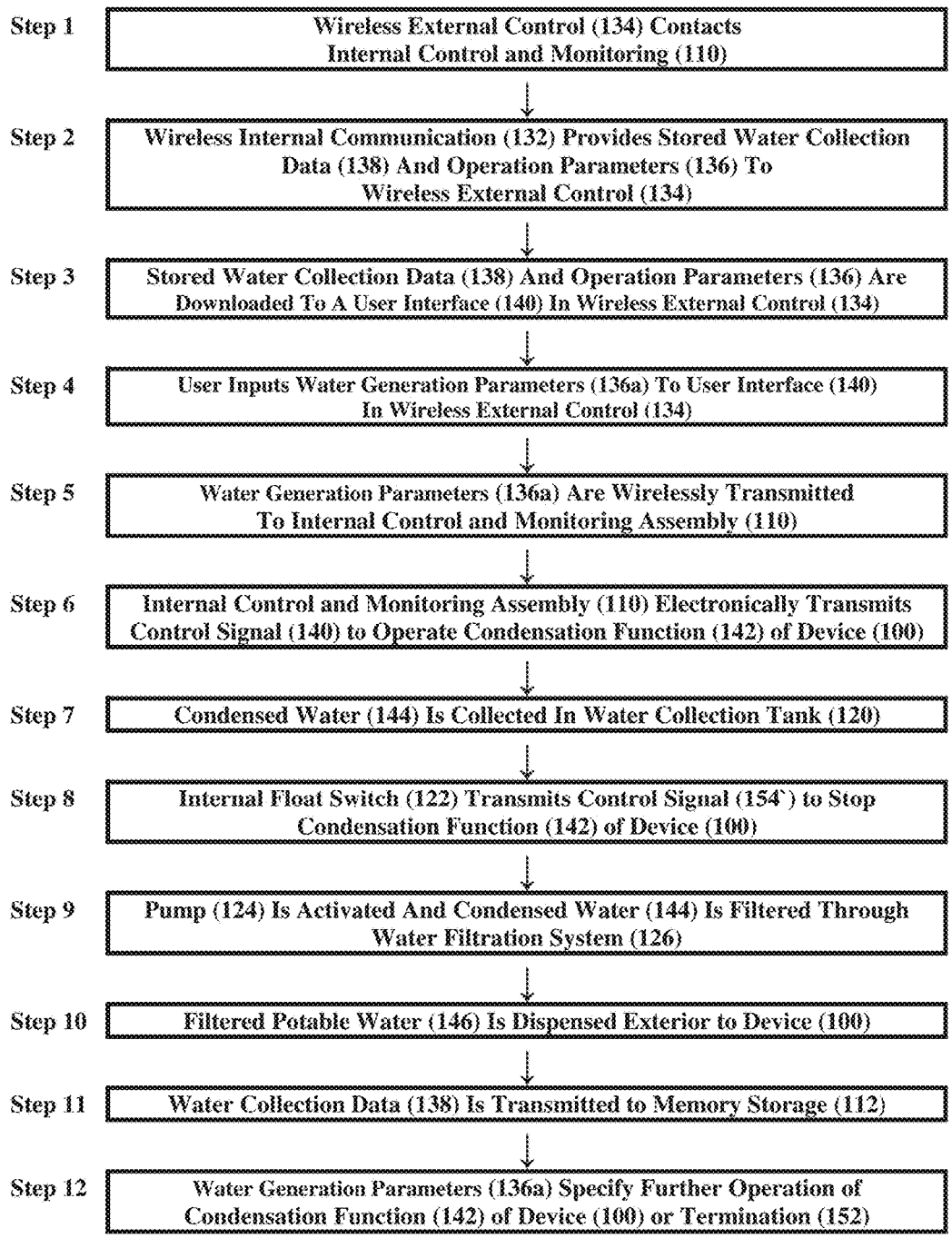
FIG. 6 is a flow chart illustrating the wireless operation of the atmospheric water generator according to another embodiment of the invention.

Referring now to FIG. 6, a flow chart illustrating the wireless operation of the atmospheric water generator according to another embodiment of the invention is shown. According to the embodiment and method shown in FIG. 6, first, a wireless external control 134 for operation and control of the device for atmospheric water generation is provided. The wireless external control comprises a user interface 140 having one or more display presentation pages for displaying a plurality of operating parameters for the atmospheric water generator device 100. The display presentation page comprises content display with a plurality of system operation parameters 136, as described herein, and a plurality of water collection data 138. At least one display is configured for user input, so a user can input and set water generation parameters 136a for operation of the atmospheric water generator. The external wireless control 134 has a controller configured to wireless contact the atmospheric water generator 100 for receiving a plurality of system operation parameters and a plurality of water collection data. The controller 134 transmits the one or more user set water generation parameters 136a to the atmospheric water generator 100.

Next, a device for atmospheric water generation 100 is provided. The device for atmospheric water generation 100 has a wireless internal control system 132 with memory storage 138 and wireless communication capability for communication with the wireless external control 134. In some embodiments, the wireless internal control system 132 incorporates Bluetooth wireless communication, such as with incorporation of a Simblee, into the wireless internal control system 132. However, other wireless communication technology can be incorporated into the device 100, as will be understood by those of skill in the art.

According to the method, one or more system operation parameters 136 or one or more water collection data 138 is then transmitted from the wireless internal control system 132 to the wireless external control 134. The one or more system operation parameters 136 or one or more water collection data 138 is then displayed on the user interface 140 of the of the wireless external control 134. A plurality of user set water generation parameters 136a is displayed on the wireless external control 134. One or more user set water generation parameters for operation of the atmospheric water generator is selected and wirelessly transmitted the atmospheric water generator. A control signal 150 is wirelessly transmitted to the device 100 to operate a condensation function 142 of the device 100 and generate filtered potable water 146. The condensation function 142 of the device comprises first, activating the refrigeration condensing unit 108 and producing condensed water 144 in the water collection tank 120. According to this step, the refrigerator compressor 114 turns on, and an air circulating fan 118, causes the evaporator coil in the evaporator condenser unit 116 to condense water from moving air. The condensed liquid drips into the water collection tank 120. The condensation function 142 terminates when the internal float switch 122 in the water collection tank 120 indicates the tank is full. Once float switch 122 is triggered, the pump 124 is turned on by a relay in the internal control and monitoring assembly 110. Condensed water 144 is pumped from the water collection tank 120 to the water filtration system 126. The condensed water 144 is filtered through the water filtration system 126 to produce filtered potable water 146 which is dispensed exterior to the device, via the water outflow conduit 128b. The internal control and monitoring assembly records the water collection data 138 to the device memory storage 112. Further operation instructions are received from the internal control and monitoring assembly 110 from the previously provided user set water generation parameters 136a. Device operation is terminated 152, or the condensation function 142 of the device is continued, until the user set water generation parameters 136a automatically terminate device operation.

When the user set water generation parameters are set to make a specific amount of water, the device will continue to generate water until the specified amount of water has been has been generated.

When the user set water generation parameters are set to control humidity, the machine will take the humidity out of the air until the temperature and humidity sensor 130 indicates to the controller that the humidity has dropped to below the set humidity level. The device operation then automatically stops when the set humidity level is reached.

The device 100 also has an auto-fill mode. In this embodiment, the device has an external float switch, contained within a cistern or other exterior water collection tank. When the controller 134 sets the device 100 to auto-fill mode, the device will generate water until the external float switch is triggered.

Although the present invention has been discussed in considerable detail with reference to certain preferred embodiments and examples described herein. However, other embodiments are possible. Therefore, the scope of the appended claims should not be limited to the description of preferred embodiments contained herein.

What is claimed is:

1. A wirelessly controlled device for atmospheric water generation, the device comprising:
   an atmospheric water generator for generating filtered potable water comprising:
      a housing, for encasing the device, the housing having a bottom plate and a top case, the top case being removably attached to the bottom plate;
      an internal control and monitoring assembly, comprising electronic controls, a wireless internal control assembly, device memory storage, and temperature and humidity sensors;
      a refrigeration condensing unit in electrical connection with the internal control and monitoring assembly, the refrigeration condensing unit comprising;
         a) a refrigerator compressor;
         b) a fan unit; and
         c) an evaporator condenser unit comprising an evaporator and a condenser, in thermal connection with the refrigerator compressor,
      a collection tank having an internal float switch, in aqueous connection with the evaporator condenser unit;
      a pump, in electrical connection with the internal control and monitoring assembly and in aqueous connection with the collection tank;
      a water filtration system, in aqueous connection with the pump and the collection tank; and
      a potable water outflow conduit in aqueous connection with the water filtration system;
   a wireless external control system comprising:
      one or more display presentation pages for displaying a plurality of operating parameters for the atmospheric water generator, the display presentation page comprising:
         (i) content display comprising a plurality of system operation parameters and a plurality of water collection data for operation of the atmospheric water generator; and
         (ii) at least one display configured for user input of user set water generation parameters for operation of the atmospheric water generator, the user set water generation parameters comprising a plurality of (x) a specified volume of water to be produced; (y) a specified humidity level, and (z) an auto-fill level;
      a controller configured to wireless contact the atmospheric water generator for receiving the system operation parameters and water collection data from the device and transmitting the one or more user set water generation parameters to the atmospheric water generator, wherein the device automatically generates filtered potable water until the device fulfills at least one of the set water generation parameters.

2. A wirelessly controlled device for atmospheric water generation according to claim 1 wherein the device has a dimension of less than or equal to 20×20×20 inches.

3. A wirelessly controlled device for atmospheric water generation according to claim 1 wherein the evaporator condenser unit is vertically aligned with the collection tank.

4. A wirelessly controlled device for atmospheric water generation according to claim 1 wherein the water filtration system comprises a return conduit for aqueous connection of the water filtration system to the collection tank.

5. A wirelessly controlled device for atmospheric water generation according to claim 1 wherein the housing is reversibly sealable such that the device is resistant to high humidity or outdoor elements.

6. A wirelessly controlled device for atmospheric water generation according to claim 1 wherein the housing further comprises a hatch for access to the water filtration system.

7. A wirelessly controlled device for atmospheric water generation according to claim 6 wherein the water filtration system is capable of filtering unpotable water added exterior to the water filtration system from the hatch and producing filtered potable water.

8. A wirelessly controlled device for atmospheric water generation according to claim 1 further comprising solar energy power components for providing power to the device.

9. A wirelessly controlled device for atmospheric water generation according to claim 1 further comprising an external float switch in electronic connection with the internal control assembly.

10. A wirelessly controlled device for atmospheric water generation according to claim 1 wherein the device further comprises a user set water generation parameter comprising an auto-fill mode and the device automatically generates filtered potable water in response to input from the internal float switch.

11. A wirelessly controlled device for atmospheric water generation according to claim 1 further comprising a manual operation switch accessible from an exterior portion of the housing for manually operating and terminating operation of the device.

12. A wirelessly controlled device for atmospheric water generation according to claim 1 wherein the content display comprises one or more historical water collection data, wirelessly transmitted from the device memory storage to the wireless external control system.

13. A wirelessly controlled device for atmospheric water generation according to claim 1 wherein the user set water generation parameter is a specified volume of water to be produced, and the device automatically generates filtered potable water until the specified volume of water is produced.

14. A wirelessly controlled device for atmospheric water generation according to claim 1 wherein the user set water generation is a specified humidity level external to the device, and the device automatically generates filtered potable water until the specified humidity level external to the device is reached.

15. A wirelessly controlled device for atmospheric water generation according to claim 1 wherein the device further comprises an external float switch and the user set water generation parameter is an auto-fill water level determined by the external float switch, and the device automatically generates filtered potable water until the water level determined by the external float switch has been reached.

16. A method of generating water using a wirelessly controlled system and device for atmospheric water generation, the method comprising:
 providing a wireless external control for operation and control of the device for atmospheric water generation, the wireless external control comprising:
  one or more display presentation pages for displaying a plurality of operating parameters for the atmospheric water generator, the display presentation page comprising:
   (i) content display comprising a plurality of system operation parameters and a plurality of water collection data for operation of the atmospheric water generator; and
   (ii) at least one display configured for user input of user set water generation parameters for operation of the atmospheric water generator, the user set water generation parameters comprising a plurality of (x) a specified volume of water to be produced; (y) a specified humidity level, and (z) an auto-fill level; and
  a controller configured to wireless contact the atmospheric water generator for receiving a plurality of system operation parameters and a plurality of water collection data, and transmitting the plurality of user set water generation parameters to the atmospheric water generator, wherein the device automatically generates filtered potable water until the device fulfills at least one of the set water generation parameters;
 providing a device for atmospheric water generation, the device for atmospheric water generation comprising a wireless internal control system having memory storage and wireless communication capability for communication with the wireless external control system, for wireless control of the device for atmospheric water generation by the wireless external control system;
 wirelessly providing one or more system operation parameters or one or more water collection data from the wireless internal control system to the wireless external control;
 displaying the one or more system operation parameters or one or more water collection data on the wireless external control;
 displaying the plurality of user set water generation parameters on the wireless external control;
 selecting one of the plurality of user set water generation parameters for operation of the atmospheric water generator,
 wirelessly transmitting the user set water generation parameters for operation of the atmospheric water generator to the wireless internal control;
 wirelessly transmitting a control signal to the device to operate a condensation function of the device and generate filtered potable water, the condensation function of the device comprising:
  (i) activating a refrigeration condensing unit and producing condensed water in a water collection tank;
  (ii) terminating water collection when an internal float switch in the water collection tank indicates the water collection tank is full;
  (iii) pumping the condensed water from the water collection tank to a water filtration system;
  (iv) filtering the condensed water through the water filtration system and to produce filtered potable, water exterior to the device; and
  (v) recording the water collection data to the device memory storage;
 receiving further operation instructions from the previously provided user set water generation parameters and terminating device operation or further operating the condensation function of the device according to steps (i)-(v) until the provided user set water generation parameters automatically terminate the generation of the filtered potable water.

17. A method of generating water using the wirelessly controlled device for atmospheric water generation according to claim 16 wherein the user set water generation parameter comprises a set volume of water to be generated.

18. A method of generating water using the wirelessly controlled device for atmospheric water generation according to claim 16 wherein the user set water generation parameter comprises a set external percent humidity and the device automatically generates filtered potable water until the percent humidity, external to the device, drops to below a the specified set external percent humidity.

19. A method of generating water using the wirelessly controlled device for atmospheric water generation according to claim 16 wherein the device for atmospheric water generation further comprises an external float switch and the user set water generation parameter comprises a set auto-fill parameter, measured by the external float switch, and the device automatically generates filtered potable water until the set auto-fill parameter is met, as measured by the external float switch.

20. A method of generating water using the wirelessly controlled device for atmospheric water generation according to claim 16 wherein the wireless internal control system communicates with the wireless external control via a low-power wireless link assembly.

* * * * *